J. T. HAM.
Seed-Planter.
No. 30,313.  Patented Oct. 9, 1860.
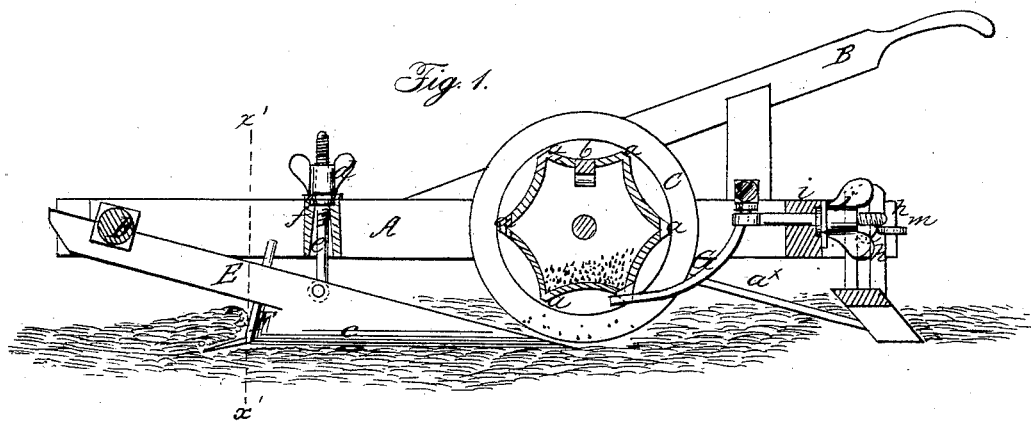
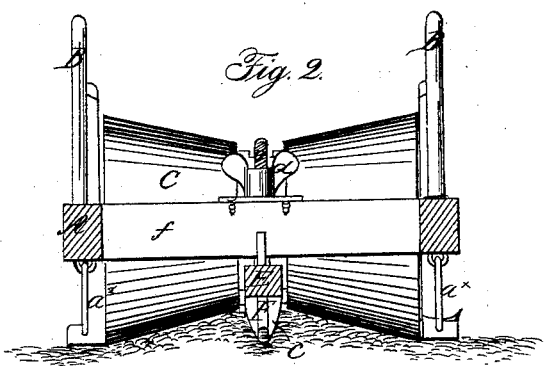
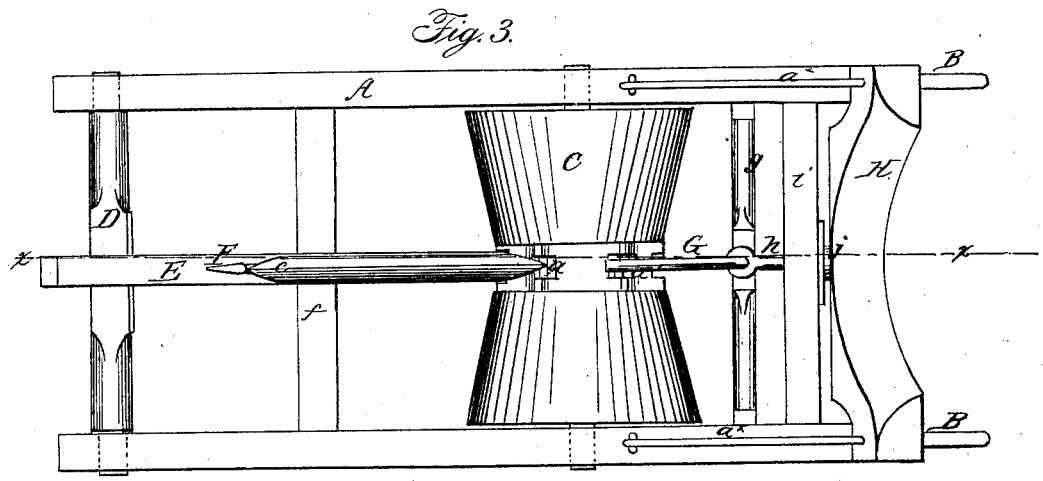
Witnesses:
J W Coombs
R. S. Spencer
Inventor:
James T. Ham
by Munn & Co
attys.

UNITED STATES PATENT OFFICE.

JAMES T. HAM, OF SENATOBIA, MISSISSIPPI.

IMPROVEMENT IN COTTON-SEED PLANTERS.

Specification forming part of Letters Patent No. 30,313, dated October 9, 1860.

*To all whom it may concern:*

Be it known that I, JAMES T. HAM, of Senatobia, in the county of De Soto and State of Mississippi, have invented a new and Improved Cotton-Seed Planter; and I do hereby declare that the following is a full, clear, and exact description of the same, reference being had to the annexed drawings, making a part of this specification, in which—

Figure 1 is a side sectional view of my invention, taken in the line $x\,x$, Fig. 3; Fig. 2, a transverse vertical section of the same, taken in the line $x\,x$, Fig. 1; Fig. 3, an inverted plan of the same.

Similar letters of reference indicate corresponding parts in the several figures.

This invention consists in the employment or use of a biconical roller or seed-hopper placed within a suitable frame which is provided with an adjustable furrow-opener, covering device, and clearer, all arranged as hereinafter described, whereby the desired work may be perfectly performed and the implement readily controlled by the attendant, and the ridges in which the seed is planted being not only preserved, but also perfected during the planting operation and left in a perfectly-rounded state, with the earth well compacted on the seed.

To enable those skilled in the art to fully understand and construct my invention, I will proceed to describe it.

A represents a rectangular frame, which is provided with handles B B and has a hollow biconical roller, C, fitted within it, the larger diameters of the roller being at its outer ends, as shown clearly in Figs. 2 and 3. At the center of this roller there are a series of openings, $a$, and the roller within is of polygonal form, the sides being slightly convex, as shown in Fig. 1. This roller C is the seed-hopper, and it is provided with a door, $b$, through which the hopper is supplied with seed.

In the front part of the frame A there is placed a shaft, D, which is allowed to turn freely in its bearings. This shaft has an arm, E, attached to it at right angles, which arm extends back toward the hopper or roller C, and has a furrow-opener, F, attached to the arm E, back of the opener F, being of share form, as shown at $c$, so as to make what might be termed a "continuation" of the opener F, the two parts forming a furrow-share.

The furrow-opener is of course in line with the openings $a$ in the roller, and the depth of the furrow may be regulated by a thumb-nut and screw, $d\,e$, the screw $e$ being attached to the arm E and passing up through a cross-piece, $f$, of the frame A, as shown clearly in Figs. 1 and 2. The shaft D, in consequence of being allowed to turn in its bearings, admits of the adjustment of the furrow-opener.

In the back part of the frame A there is placed a shaft, $g$, to which a curved rod, G, is attached. This rod G extends under the roller or hopper C in line with the openings $a$. The upper part of the rod G has a screw, $h$, connected to it, and this screw extends horizontally through a traverse-bar, $i$, in the frame A, and has a thumb-nut, $j$, on it, as shown in Fig. 1. By turning this thumb-nut $j$ the end of rod G may be brought nearer to or farther from the opening $a$ of roller or hopper C, the shaft $g$ being allowed to turn freely in the frame A.

To the back part of the frame A there is also attached, by adjustable pendants $k\,k$, a bar, H, the lower surface of which is hollowed out so as to approximate to the concave form of the roller or hopper C. The pendants $k$ are slotted longitudinally, and screws $b$ pass through the slots, the screws having thumb-nuts $m$ placed on them. By this arrangement it will be seen that the bar H may be adjusted to the desired height. The bar H is stayed or braced by rods $n$.

As the machine is drawn along, the roller or hopper C is of course rotated and the seed discharged through the openings $a$. The furrow to receive the seed is made by the opener F $c$, and the rod G insures an even discharge of the seed, preventing all clogging of the openings $a$ and keeping them open and free—an essential feature in the planting of cotton-seed.

The biconical form of the roller or hopper C preserves the ridge in which the seed is planted, and the bar H, while also preserving the ridge, covers the seed and compacts the earth on the same.

Having thus described my invention, what I claim as new, and desire to secure by Letters Patent, is—

1. The combination of the biconical roller or hopper C with the adjustable rod G, arranged for joint operation, as and for the purpose set forth.

2. In connection with the roller or hopper C and rod G, the adjustable arm E, provided with the furrow-openers F c and the adjustable bar H, all being arranged substantially as and for the purpose set forth.

JAMES T. HAM.

Witnesses:
R. STEWART,
G. B. WOLLARD.